(12) United States Patent
Kloppenburg et al.

(10) Patent No.: US 10,005,857 B2
(45) Date of Patent: Jun. 26, 2018

(54) FUNCTIONALIZED POLYMER COMPOSITION

(71) Applicant: ARLANXEO Deutschland GmbH, Dormagen (DE)

(72) Inventors: Heike Kloppenburg, Duesseldorf (DE); Ulrich Feldhues, Bergisch Gladbach (DE); Heinz Unterberg, Dormagen (DE); Hermann-Josef Weidenhaupt, Pulheim (DE); Melanie Wiedemeier-Jarad, Dormagen (DE); Alicia Le-Sattler, Bochum (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 49 days.

(21) Appl. No.: 15/030,133

(22) PCT Filed: Oct. 9, 2014

(86) PCT No.: PCT/EP2014/071681
§ 371 (c)(1),
(2) Date: Apr. 18, 2016

(87) PCT Pub. No.: WO2015/055508
PCT Pub. Date: Apr. 23, 2015

(65) Prior Publication Data
US 2016/0280815 A1 Sep. 29, 2016

(30) Foreign Application Priority Data
Oct. 16, 2013 (EP) .................................... 13188985

(51) Int. Cl.
| | | |
|---|---|---|
| *C08F 36/14* | (2006.01) | |
| *C08C 19/08* | (2006.01) | |
| *C08C 19/20* | (2006.01) | |
| *C08L 15/00* | (2006.01) | |
| *C08F 12/30* | (2006.01) | |
| *C08K 3/04* | (2006.01) | |

(52) U.S. Cl.
CPC .............. *C08F 36/14* (2013.01); *C08C 19/08* (2013.01); *C08C 19/20* (2013.01); *C08F 12/30* (2013.01); *C08K 3/04* (2013.01); *C08L 15/00* (2013.01); *C08F 2500/17* (2013.01); *C08F 2810/20* (2013.01); *C08F 2810/40* (2013.01)

(58) Field of Classification Search
CPC ...... C08F 36/14; C08F 12/30; C08F 2810/20; C08F 2810/40; C08F 2500/17; C08K 3/04; C08C 19/08; C08C 19/20; C08L 15/00
See application file for complete search history.

(56) References Cited

U.S. PATENT DOCUMENTS

| | | |
|---|---|---|
| 3,374,191 A | 3/1968 | Nutzel |
| 4,076,550 A | 2/1978 | Thurn et al. |
| 4,260,707 A | 4/1981 | Sylvester et al. |
| 5,543,974 A | 8/1996 | Buding |
| 5,567,784 A | 10/1996 | Wieder et al. |
| 5,663,226 A | 9/1997 | Scholl et al. |
| 5,914,377 A | 6/1999 | Sylvester et al. |
| 6,268,421 B1 | 7/2001 | Dittrich et al. |
| 6,417,285 B2 | 7/2002 | Giebeler et al. |
| 6,521,698 B2 | 2/2003 | Scholl et al. |
| 6,576,731 B2 | 6/2003 | Steinhauser et al. |
| 6,759,497 B2 | 7/2004 | Gruen et al. |
| 9,079,981 B2 | 7/2015 | Kloppenburg et al. |
| 2007/0037916 A1* | 2/2007 | Watanabe ................ B60C 1/00 524/493 |

FOREIGN PATENT DOCUMENTS

| | | |
|---|---|---|
| DE | 19544469 A1 | 3/1997 |
| EP | 0011184 A1 | 5/1980 |
| EP | 0127236 A1 | 12/1984 |

OTHER PUBLICATIONS

European Search Report from European Application No. 13188985, dated Feb. 11, 2014, two pages.

* cited by examiner

*Primary Examiner* — Robert Jones, Jr.

(57) ABSTRACT

Vulcanizable polymer compositions based on backbone-functionalized polydienes having the general formula (I):

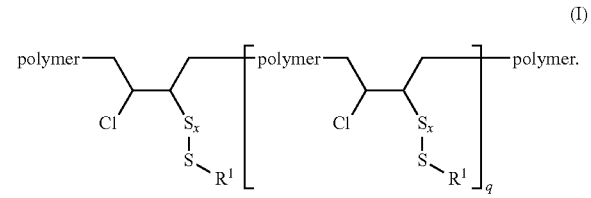

20 Claims, No Drawings

FUNCTIONALIZED POLYMER COMPOSITION

The invention relates to vulcanizable polymer compositions based on functionalized polydienes, such as polybutadienes, to a process for their production, to a process for the production of vulcanizates thereof, to the vulcanizates thus obtained and to their use.

Polybutadienes are employed as important constituents of rubber mixtures in the tyre industry, where an improvement of the final properties, such as, for example, a reduction of the rolling resistance and of abrasion is desired. Golf ball cores or soles of shoes are a further field of application, a high rebound elasticity being in focus here.

Polybutadienes containing a high proportion of cis-1,4 units have been produced for a long time on a large industrial scale and are employed for the manufacture of tyres and other rubber goods as well as for the impact modification of polystyrene.

In order to obtain high proportions of cis-1,4 units, catalysts based on compounds of the rare earths are employed almost exclusively at present, as described, for example, in EP-A1 0 011 184 and EP-B-A1 0 007 027.

It is known from the prior art that neodymium-catalyzed polybutadienes, especially high-cis-polybutadienes, have particularly advantageous properties with respect to rolling resistance, abrasion and rebound elasticity. The catalyst systems employed play an important role in the production of polybutadienes.

The neodymium catalyst employed industrially, for example, is a Ziegler/Natta system, which is formed from a number of catalyst components. During the catalyst formation, different catalyst centres are usually formed, which can be identified in the polymer based on an at least bimodal molar mass distribution. In the Ziegler/Natta catalyst system, the known three catalyst components, usually consisting of a neodymium source, a chloride source and an organoaluminium compound are mixed in different types and ways under specific temperature conditions, the catalyst system being prepared for the polymerization with or without ageing.

A number of production processes for Ziegler/Natta catalyst systems which are employed for the production of polybutadienes are known from the prior art.

EP 0 127 236, in which the catalyst is prepared by the mixing of neodymium oxides, neodymium alkoxides and carboxylates with an organic metal halide as well as an organic compound at a temperature of 20° C. to 25° C., is likewise known from the prior art. It is also possible to carry out the mixing of these 4 components at 50° C. to 80° C. In this variant, the mixture is cooled to 20 to 25° C., then DIBAH is added. Ageing is not mentioned.

A process for the production of polybutadienes having a reduced solution viscosity/Mooney viscosity ratio is known from EP 1 176 157 B1, in which the catalyst preparation is carried out with pre-formation. Here, the neodymium versatate is first mixed at 50° C. with DIBAH and isoprene, subsequently this mixture is cooled to 5° C., then ethylaluminium sesquichloride (EASC) is added. The ageing can take several minutes to several days at a temperature between 10° C. and −80° C. During the polymerization, comonomers, such as, for example, a bisdiene, are added to increase the degree of branching of the polymer and thus also to obtain the very narrow solution viscosity/Mooney viscosity ratio. The branched polymer obtained here has at least 4 free chain ends per molecule as a result of the coupling via the bisdiene, whereas linear molecules have only 2 chain ends.

It is known that commercially produced polymers have a statistical molar mass distribution, where the width of the molar mass distribution is influenced by the catalyst preparation.

The number of chain ends in the polymer is responsible for the energy dissipation. The higher the number of free chain ends, the higher the energy dissipation by the polymer. The lower the energy dissipation of the polymer, however, the lower, for example, the rolling resistance and the better the rebound elasticity of the polymer. Correspondingly, the final properties of a linear polymer having only 2 chain ends per molecule are always better than those of a branched polymer with the same molar mass.

Furthermore, it is known that the introduction of functional groups at the polymer chain ends enables a physical or chemical binding of these chain ends to the filler surface. Its mobility is thereby restricted and thus the energy dissipation in the case of dynamic stress of the tyre tread is reduced. At the same time, these functional end groups can improve the dispersion of the filler in the tyre tread, which can lead to a weakening of the filler network and thus to a further reduction of the rolling resistance. For this purpose, numerous methods for end group functionalization have been developed. For example, the use of siloxane-containing compounds as a combination of end group functionalization reagents and nano-couplers is described in WO 2009/021906 A1. A disadvantage of the end group functionalization is that a maximum of one polar group per molecule can be formed here.

The backbone functionalization, on the other hand, enables the introduction of a number of polar groups per polymer chain, so that the binding between polymer and filler over the number of coupling sites thus increased is improved.

The backbone functionalization is known for anionic polymerization and is described, inter alia, in EP 1 130 034 A2. The binding takes place as a combination of a free-radical activation of the polymer chains with subsequent binding of a polar group, preferably with a thiol functionalization. This reaction is described both for anionically polymerized polybutadienes as well as for anionically produced styrene-butadiene copolymers. In all cases, the polymer described has a content of vinyl groups of over 10% by wt. The free radical activation preferably takes place at the vinyl units of the polybutadiene and is therefore not suitable for neodymium-catalyzed polybutadienes with a vinyl content of below 1% by wt.

In EP 1 397 390 B1, the backbone functionalization of neodymium-catalyzed polybutadienes is described. The activation of the polymer chain taking place here via a "superbasic" system. Here, an anionic structure is formed on the polymer chain, which can subsequently react with polar compounds, such as, for example, acid chlorides. A disadvantage of this reaction is that the addition of the superbases must take place in excess, as the catalyst contained in the polymer reacts with these compounds. As a side reaction, slight gelling of the polymer also occurs here, such that after the functionalization the gel content in the polymer increases.

It is common to all functionalized polymers known from the prior art that they show a difficult processing behaviour, which can manifest itself, for example, in a longer mixing time, an increased mixing viscosity or even in tough extrudates in the processing of the finished mixtures.

It is furthermore known that polydienes with low cold-flow can be prepared if the diene polymers are treated after the polymerization with disulphur dichloride, sulphur dichloride, thionyl chloride, disulphur dibromide or thionyl bromide (DE AS 12 60 794).

DE 44 36 059 A1 likewise describes a process for the sudden increase of the molecular weight of Nd-catalyzed diene rubbers, the characteristic odour of the polymer being developed by a relaxation step after the polymerization. Thus all low-boiling constituents of the reaction mixture can be removed. The Mooney jump here is about 27% higher than the Mooney viscosity of the diene rubber after the polymerization.

By means of the reaction of neodymium-catalyzed polybutadienes with sulphur chlorides, long-chain branched polymer structures are obtained, which manifest themselves advantageously in the processing behaviour, but have no polar groups, which can interact, for example, with the fillers.

The object was therefore to prepare new polymer compositions having a high degree of functionalization, which offer a good processing behaviour and from which tyres with improved wet skid resistance, lower rolling resistance and high mechanical strength and improved abrasion behaviour can be manufactured.

The object is achieved by a vulcanizable polymer composition based on functionalized polydienes, the functionalized polydienes having the general formula (I):

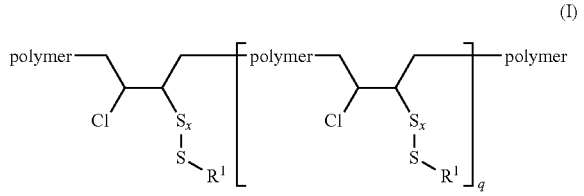

(I)

where
x is identical or different and is an integer from 1 to 8, preferably 1 to 3; particularly preferably 1,
q is identical or different and represents a number between 0 and 20,
polymer is identical or different and represents polymer units of the formula (II)

(II)

where
n is identical or different and represents a number between 1 and 200 000,
m is identical or different and represents a number between 0 and 50 000, preferably between 0 and 10, particularly preferably between 0 and 6,
p is identical or different and represents a number between 1 and 100 000,
diene: is formed by polymerization of butadiene and/or isoprene and preferably represents $—C_4H_6—$ or $—C_5H_8—$ styrene: is formed by polymerization of styrene or substituted styrene and preferably represents $—C_2H_3(C_6H_5)—$;
$R^1$ is identical or different and selected from a group of compounds of the formula (III)

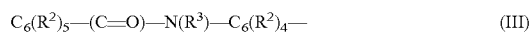

(III)

where $R^2$ and $R^3$ are identical or different and
represent a hydrogen radical, a linear or branched alkyl radical having 1 to 16 C atoms, preferably 1 to 8 C atoms, a phenyl radical or a cycloalkyl radical having 5 to 8 C atoms;
radicals of the formula (IV)

(IV)

where $R^4$ is identical or different and represents a hydrogen, a halogen, a nitro or a hydroxyl radical, a linear or branched alkyl radical having 1 to 12 C atoms, preferably 1 to 8 C atoms, a linear or branched alkoxy radical having 1 to 12 C atoms, preferably 1 to 8 C atoms, a phenyl radical or a cycloalkyl radical having 5 to 8 C atoms or jointly forms the radical of the formula (V);

(V)

where $R^5$ is identical or different and represents a hydrogen radical, a hydroxyl radical, a linear or branched alkyl radical having 1 to 12 C atoms, preferably 1 to 8 C atoms, a linear or branched alkoxy radical having 1 to 12 C atoms, preferably 1 to 8 C atoms, a phenyl radical or a cycloalkyl radical having 5 to 8 C atoms;
radicals of the formula (VI)

(VI)

where
n is an integer from 1 to 12, preferably 1 to 6;
m is a number from 0 to 4, preferably 0 to 2;
$R^6$ is identical or different and represents a linear or branched alkyl radical having 1 to 16 C atoms, preferably 1 to 8 C atoms, a phenyl radical or a cycloalkyl radical having 5 to 8 C atoms;
Y represents sulphur, a radical of the formula VIIa, VIIb, VIIc, VIId or VIIe

(VIIa)

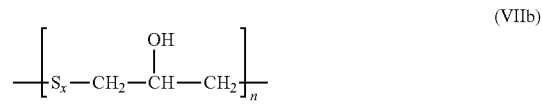

(VIIb)

-continued $$-\negthickspace+\negthickspace S_x-CH_2-CH_2OCH_2CH_2\negthickspace+\negthickspace_n\qquad(VIIc)$$

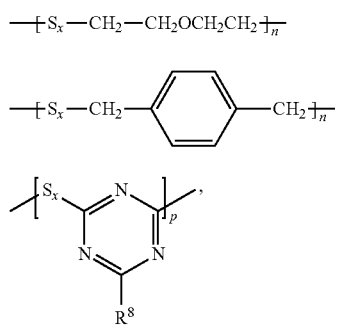
(VIId)

(VIIe)

where
x is an integer from 1 to 8, preferably 2 to 6;
p is an integer from 1 to 12, preferably 1 to 6;

$R^8$ is identical or different and represents a linear or branched alkyl radical having 1 to 16 C atoms, preferably 1 to 8 C atoms, and an alkoxy radical having 1 to 16 C atoms, preferably 1 to 8 C atoms, a phenyl radical or a phenoxy radical;
radicals of the formula (VIII)

$$(R^9)_2N-(C=Z)-\qquad(VIII)$$

where

Z represents sulphur or oxygen, $R^9$ is identical or different and represents a linear or branched alkyl radical having 1 to 16 C atoms, preferably 1 to 8 C atoms, a phenyl radical or a cycloalkyl radical having 5 to 8 C atoms;
radicals of the formula (IX)

$$R^{10}-O-C(=S)-\qquad(IX)$$

where $R^{10}$ is identical or different and represents a linear or branched alkyl radical having 1 to 16 C atoms, preferably 1 to 8 C atoms, a phenyl radical or a cycloalkyl radical having 5 to 8 C atoms.

Surprisingly, it has now been found that the polymer composition according to the invention fulfils this object.

All polybutadienes known from the prior art can be employed, provided their Mooney viscosity (ML 1+4 at 100° C.) was increased after polymerization by a viscosity increasing modification. Modifications of this type are also known to the person skilled in the art under the names "jump-like increase in the Mooney viscosity", "Mooney-jumped" or "Mooney jump".

The description "jump-like increase in the Mooney viscosity" and its modifications, such as, for example, "Mooney-jumped" or "Mooney jump", refer to techniques, according to which the Mooney viscosity (ML 1+4 at 100° C.) of the polymers after polymerization is significantly increased and/or the degree of branching is increased. Customarily, the polymerizate is modified with $S_2Cl_2$ to branch the polymer by means of sulphur bridge bonding according to the following schematic reaction equation:

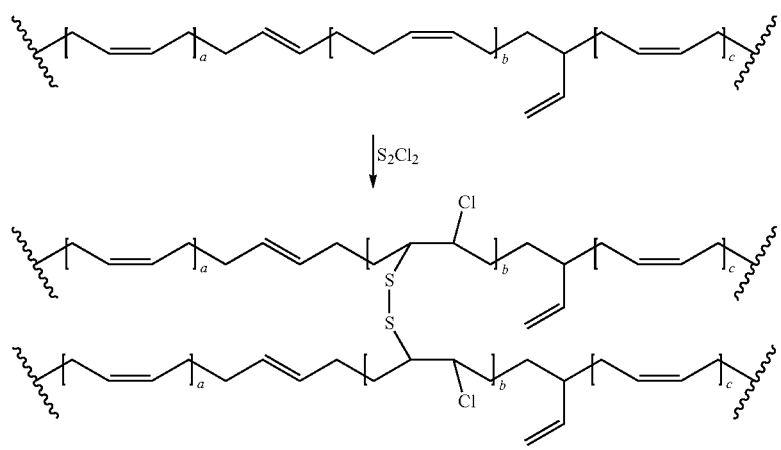

The degree of branching and/or the Mooney viscosity (ML 1+4 at 100° C.) is thus increased. The reaction scheme shown above describes the "Mooney jump" by way of example for a high-cis-polybutadiene, whereas this reaction can also be carried out on all other diene-containing polymers, such as described as polymer of the formula (II).

Customarily, sulphur halides, preferably disulphur dichloride, sulphur chloride, sulphur bromide, sulphur dichloride, thionyl chloride, disulphur dibromide or thionyl bromide are used for the modification.

Preferably, high-molecular weight neodymium-catalyzed polybutadienes (NdBRs) having a proportion of cis-1,4-units of >95% by wt. and a proportion of 1,2-vinyl content of <1% by wt. which are Mooney jumped such that their Mooney viscosities (ML 1+4 at 100° C.) are increased after the polymerization, are employed for preparing functionalized NdBRs for the vulcanizable polymer composition according to the invention.

Preferably, NdBR is modified with sulphur chlorides after the polymerization.

Preferably, styrene-butadiene copolymers can also be employed, where the copolymers are modified, such that their Mooney viscosity (ML 1+4 at 100° C.) is increased after the polymerization. Likewise, an LiBR can be used.

The functionalized polydienes of the vulcanizable polymer composition according to the invention preferably have the following characteristics:

a. a molar mass (Mw) of between 1 and 10 000 kg/mol,
b. a polydispersity as Mw/Mn of 1 to 5, preferably 1.2 to 3.0,
c. a Mooney viscosity in the range from 30 MU to 150 MU,
d. a content of sulphur of 0.02 to 1% by wt., preferably 0.04 to 0.5% by wt., based on 100% by wt. of the functionalized polydienes,
e. a content of chlorine of 0.01 to 1% by wt. preferably 0.02 to 0.5% by wt., based on 100% by wt. of the functionalized polydienes, and/or
f. the number of groups $R^1$ is 1 to 21, preferably 2 to 15, units per polymer unit, based on 100% by wt. of the functionalized polydienes.

For the production of the functionalized polydienes, a functionalization reagent mixture containing a compound having the general formula (X)

$$R^1\text{—}S\text{—}S\text{—}R^1 \qquad (X)$$

where
$R^1$ is identical or different and selected from a group consisting of
radicals of the formula (III)

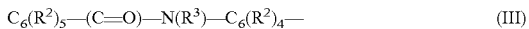
$$C_6(R^2)_5\text{—}(C\!\!=\!\!O)\text{—}N(R^3)\text{—}C_6(R^2)_4\text{—} \qquad (III)$$

where $R^2$ and $R^3$ are identical or different and represent a hydrogen radical, a linear or branched alkyl radical having 1 to 16 C atoms, preferably 1 to 8 C atoms, a phenyl radical or a cycloalkyl radical having 5 to 8 C atoms;

radicals of the formula (IV)

where $R^4$ is identical or different and represents a hydrogen, a halogen, a nitro or a hydroxyl radical, a linear or branched alkyl radical having 1 to 12 C atoms, preferably 1 to 8 C atoms, a linear or branched alkoxy radical having 1 to 12 C atoms, preferably 1 to 8 C atoms, a phenyl radical or a cycloalkyl radical having 5 to 8 C atoms or jointly forms the radical of the formula (V);

where $R^5$ is identical or different and represents a hydrogen radical, a hydroxyl radical, a linear or branched alkyl radical having 1 to 12 C atoms, preferably 1 to 8 C atoms, a linear or branched alkoxy radical having 1 to 12 C atoms, preferably 1 to 8 C atoms, a phenyl radical or a cycloalkyl radical having 5 to 8 C atoms;

radicals of the formula (VI)

$$(R^6O)_3Si\text{—}(CH_2)_n\text{—}(Y)_m\text{—} \qquad (VI)$$

where
n is an integer from 1 to 12, preferably 1 to 6;
m is a number from 0 to 4, preferably 0 to 2;
$R^6$ is identical or different and represents a linear or branched alkyl radical having 1 to 16 C atoms, preferably 1 to 8 C atoms, a phenyl radical or a cycloalkyl radical having 5 to 8 C atoms;
Y represents sulphur, a radical of the formula VIIa, VIIb, VIIc, VIId or VIIe

(VIIa)

(VIIb)

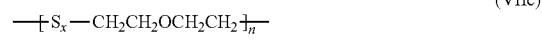

(VIIc)

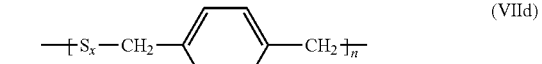

(VIId)

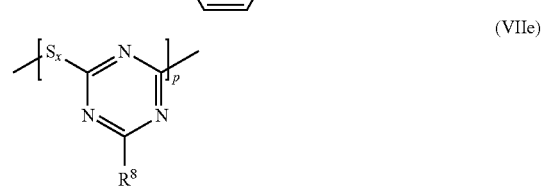

(VIIe)

where
x is an integer from 1 to 8, preferably 2 to 6;
p is an integer from 1 to 12, preferably 1 to 6;
$R^8$ is identical or different and represents a linear or branched alkyl radical having 1 to 16 C atoms, preferably 1 to 8 C atoms, and an alkoxy radical having 1 to 16 C atoms, preferably 1 to 8 C atoms, a phenyl radical or a phenoxy radical;

radicals of the formula (VIII)

$$(R^9)_2N\text{—}(C\!\!=\!\!Z)\text{—} \qquad (VIII)$$

where
Z is sulphur or oxygen,
$R^9$ is identical or different and represents a linear or branched alkyl radical having 1 to 16 C atoms, preferably 1 to 8 C atoms, a phenyl radical or a cycloalkyl radical having 5 to 8 C atoms;

radicals of the formula (IX)

$$R^{10}\text{—}O\text{—}C(\!\!=\!\!S)\text{—} \qquad (IX)$$

where
$R^{10}$ is identical or different and represents a linear or branched alkyl radical having 1 to 16 C atoms, preferably 1 to 8 C atoms, a phenyl radical or a cycloalkyl radical having 5 to 8 C atoms, is added to and reacted with Mooney jumped polymers, such Mooney jumped polymers being ones having their Mooney viscosity (ML 1+4 at 100° C.) increased post polymerization.

Generally, the reaction of the functionalization reagent and Mooney jumped polymer is illustratively, and without limitation, represented by the following reaction scheme:

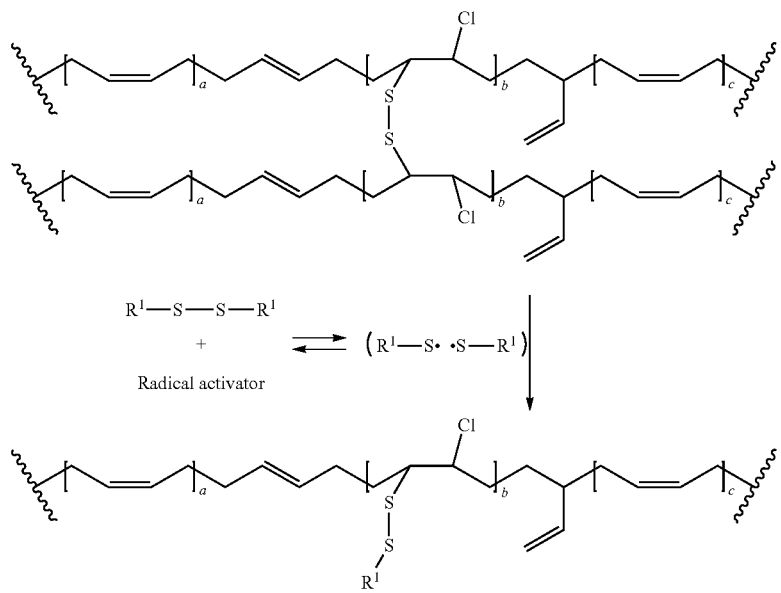

By means of the treatment with the functionalization reagent mixture, the "Mooney-jumped" polymer can be functionalized on the polymer chain. Surprisingly, vulcanizates produced therefrom have an improved rolling resistance and an improved abrasion behaviour.

Preferably, the functionalization is carried out on the "Mooney-jumped" polymer solid.

Preferably, the functionalization reagent mixture contains a compound of the formula (IIIa)

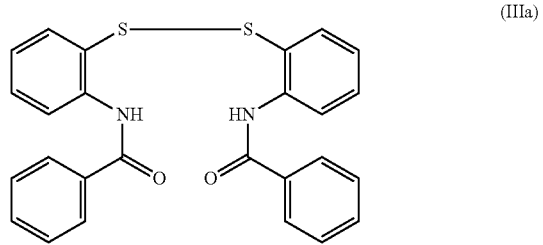 [SMILES: O=C(Nc1ccccc1SSc1ccccc1NC(=O)c1ccccc1)c1ccccc1]

(IIIa)

Preferably, the functionalization reagent mixture contains a compound of the formula (VIa)

$(EtO)_3Si—C_3H_6—S_4—C_3H_6—Si(OEt)_3$     (VIa)

Particularly preferably, the functionalization reagent mixture contains a compound of the formula (VIb)

$(EtO)_3Si—C_3H_6—S_2—C_3H_6—Si(OEt)_3$     (VIb)

Also preferably, the functionalization reagent mixture can contain tetramethylthiuram disulphide.

Also preferably, the functionalization reagent mixture can contain 2,2'-dibenzamidodiphenyl disulphide (DBD).

The functionalization reagent mixture preferably contains as activators transition metal salts, where the transition metal is selected from the group consisting of Fe, Co, Cu, Ni, Mn, Cr and preferably Fe.

The Fe salts are particularly preferably Fephthalocyanine or Fehemiporphyrazine.

Also preferably, the functionalization reagent mixture contains as activators pentachlorothiophenol and its salts, preferably Zn salts.

As activators, the functionalization reagent mixture can also contain organic peroxides according to the formula (XI)

$R^{11}—O—O—R^{12}$     (XI)

where $R^{11}$ and $R^{12}$ are identical or different and represent a
  hydrogen radical,
  a linear or branched alkyl radical having 1 to 16 C atoms, preferably 1 to 8 C atoms, a phenyl radical, a cycloalkyl radical having 5 to 8 C atoms,
  a carboxyl radical $R^{13}—(C=O)—$, where $R^{13}$ represents a linear or branched alkyl radical having 1 to 16 C atoms, preferably 1 to 8 C atoms, a phenyl radical or a cycloalkyl radical having 5 to 8 C atoms.

Customarily, the functionalization reagent mixture contains waxes and/or fillers.

As waxes, for example, hydrocarbons, such as oils, paraffins and PE waxes, fatty alcohols having 6 to 20 C atoms, ketones, carboxylic acids, such as fatty acids and montanic acids, oxidized PE wax, metal salts of carboxylic acids, carboxamides and carboxylic acid esters, for example esters of ethanol, fatty alcohols, glycerol, ethanediol, pentaerythritol and long-chain carboxylic acids, can be employed as an acid component.

As fillers, active or inactive fillers can be used, which are also employed, for example, for the rubber mixtures, such as described below.

Preferably, the polymer solid employed is blended with the functionalization reagent mixture with thermal and/or mechanical energy input.

The polymer solid can at the same time in addition contain volatile constituents, such as water, free radical monomers or solvent. These constituents can be removed after or during the thermal treatment of the polymer containing the functionalization reagent mixture.

For mixing in, all customary mixing units can be used, such as, for example, rollers, kneaders, mixers, nozzles or extruders, where the mixing units can be employed individually or in combination.

Furthermore, it is possible to add the functionalization reagent mixture to the polymerizate with the sulphur chlorides at any point after reaction is complete. The polymerizate is then worked up as customary, the thermal and/or mechanical energy input taking place in the mixing in the workup. The separation of the solvent preferably takes place by stripping with subsequent drying or by evaporation of the polymerizate, for example by means of an extruder or a drying roller.

Stabilizers are customarily added to the polymerizate, the stabilizers being added before, during or after the treatment with the functionalization reagent mixture.

For the treatment with the functionalization reagent mixture, temperatures between 70° C. and 160° C., particularly preferably between 80° C. and 140° C., are preferred. The temperature depends on the activator employed. Preferably, the temperature in the case of the use of iron phthalocyanine, as activator, is between 90° C. and 150° C., particularly preferably between 100° C. and 140° C. In the case of the use of pentachlorothiophenol, the preferred temperature is 70° C. to 120° C. Without activator in the functionalization reagent mixture, higher temperatures are preferably needed, which customarily lie between 100° C. and 160° C.

The duration of the treatment depends on the temperature of the polymer and on the nature and amount of the activator used in the functionalization reagent mixture. The customary treatment period is between 1 min and 60 min, preferably between 5 and 40 min, particularly preferably between 10 and 30 min. A longer treatment period is possible and has no influence on the reaction. For economic reasons, the shortest reaction time is to be preferred.

Preferably, the functionalization reagent mixture has the following composition:
a) 5 to 100% by wt. of one or more compounds of the formula (X), preferably 30 to 50% by wt.,
b) optionally 0.01 to 5% by wt. of activators, preferably 0.3-1% by wt., proportionally to loads of the compound of formula (X),
c) optionally 0.01 to 90% by wt. of waxes, preferably 30-50% by wt., proportionally to loads of the compound of formula (X),
d) optionally 0.01 to 90% by wt. of fillers, preferably 10-30% by wt., proportionally to loads of the compound of formula (X),
based on 100% by wt. of functionalization reagent mixture.

Preferably, 100% by wt. of one or more compounds of the formula (X) can also be employed as a functionalization reagent.

The compositions according to the invention can be used alone, in a blend with aromatic or aliphatic oils or in a mixture with other rubbers. Besides natural rubber, synthetic rubbers are also suitable as additional rubbers for the production of rubber vulcanizates. Preferred rubbers are in particular natural rubber, emulsion SBR and solution SBR rubbers, which can optionally be modified with silyl ethers or other functional groups, such as described in EP-A-0 447 066, polybutadiene rubber having a high 1,4-cis content (>90% by wt.), which is prepared using catalysts based on Ni, Co, Ti or Nd, as well as polybutadiene rubber having a vinyl content of 0 to 75% by wt., and mixtures thereof of interest.

The rubber mixtures are a further subject of the invention and as a rule contain 5 to 300 parts by wt. of an active or inactive filler, such as, e.g.
highly disperse silicic acids, prepared, for example, by precipitation of solutions of silicates or flame hydrolysis of silicon halides having specific surface areas of 5 to 1000, preferably 20 to 400, m$^2$/g (BET surface area) and having primary particle sizes of 10 to 400 nm. The silicic acids can optionally also be present as mixed oxides with other metal oxides, such as Al, Mg, Ca, Ba, Zn, Zr or Ti oxides,
synthetic silicates, such as aluminium silicate, alkaline earth metal silicates such as magnesium silicate or calcium silicate, having BET surface areas of 20 to 400 m$^2$/g and primary particle diameters of 10 to 400 nm,
natural silicates, such as kaolin and other naturally occurring silicic acids,
glass fibres and glass fibre products (mats, strands) or glass microspheres,
metal oxides, such as zinc oxide, calcium oxide, magnesium oxide, aluminium oxide,
metal carbonates, such as magnesium carbonate, calcium carbonate, zinc carbonate,
metal hydroxides, such as, e.g., aluminium hydroxide, magnesium hydroxide,
metal salts, such as, e.g., zinc or magnesium salts of [alpha],[beta]-unsaturated fatty acids, such as, e.g., acrylic or methacrylic acid having 3 to 8 carbon atoms, such as zinc acrylate, zinc diacrylate, zinc methacrylate, zinc dimethacrylate and mixtures thereof;
carbon blacks. The carbon blacks to be used here are produced by the lamp black, furnace black or gas black processes and have BET surface areas of 20 to 200 m$^2$/g, such as, e.g. SAF, ISAF, HAF, FEF or GPF carbon blacks.
rubber gels, in particular those based on polybutadiene, butadiene/styrene copolymers, butadiene/acrylonitrile copolymers and polychloroprene.

Zinc diacrylates, highly disperse silicic acids and carbon blacks are particularly preferred.

The fillers mentioned can be employed alone or in a mixture. In a particularly preferred embodiment, the rubber mixtures contain as fillers a mixture of light fillers, such as highly disperse silicic acids, and carbon blacks, where the mixing ratio of light fillers to carbon blacks is 0.05 to 20, preferably 0.1 to 10.

The fillers are preferably added as solids or as a slurry in water or a solvent for dissolving the polybutadiene(s) according to the invention. The rubber solution can be prepared beforehand, but preferably the solution originating from the polymerization is employed directly. Subsequently, the solvent is removed thermally or preferably with the aid of steam. The conditions of this stripping process can easily be determined by preliminary experiments.

Furthermore, the fillers are preferably added to the solid polybutadiene according to the invention or to a mixture of rubbers and blended in a known manner, e.g. using a kneader.

The rubber mixtures according to the invention optionally furthermore contain cross-linkers. As cross-linkers, sulphur or peroxides can be employed, sulphur being particularly preferred. The rubber mixtures according to the invention can contain further rubber auxiliary products, such as reaction accelerators, anti-ageing agents, heat stabilizers, light stabilizers, ozone stabilizers, processing aids, plasticizers, tackifiers, propellants, dyes, pigments, waxes, extenders, organic acids, retardants, metal oxides and activators such as triethanolamine, polyethylene glycol, hexanetriol etc., which are known to the rubber industry.

In the preferred rubber mixtures containing highly active precipitated silicic acids, the use of additional filler activators is particularly advantageous. Preferred filler activators are sulphur-containing silyl ethers, in particular bis(trialkoxysilylalkyl)polysulphides, such as described in DE-A-2 141 159 and DE-A-2 255 577, oligomeric and/or polymeric sulphur-containing silyl ethers of DE-A-4 435 311 and EP-A-0 670 347, mercapto-alkyltrialkoxysilanes, in particular mercaptopropyltriethoxysilane and thiocyanatoalkylsilyl ethers, as described, e.g., in DE-A-195 44 469.

The rubber auxiliaries are employed in customary amounts, which depend, inter alia, on the intended use. Customary amounts are, e.g., amounts from 0.1 to 50% by wt., based on rubber.

The further admixture of the rubbers with the other rubber auxiliary products, cross-linkers and accelerators mentioned can be carried out in customary manner with the aid of suitable mixing equipment, such as rollers, internal mixers and mixing extruders.

The vulcanization of the rubber mixtures according to the invention can take place at customary temperatures of 100 to 200° C., preferably 130 to 180° C. (optionally under pressure 10 to 200 bar).

The rubber mixtures according to the invention are outstandingly suitable for the production of mouldings of all types.

Non-limiting examples of these mouldings are O-rings, profiles, seals, membranes, tyres, tyre treads, damping elements and hoses.

Various tyre components and tyre treads are particularly preferred.

Furthermore, the rubber mixtures according to the invention are suitable for the impact modification of thermoplastics, in particular of polystyrene and styrene/acrylonitrile copolymers.

Particularly suitable is the use of the rubber mixtures for golf balls, in particular golf ball cores.

The scope of the invention includes all general radical definitions, indices, parameters and explanations or radical definitions, indices, parameters and explanations in preferred ranges with each other, that is to say also between the respective ranges and preferred ranges, mentioned in any desired combination above and below.

The invention is illustrated in more detail below with the aid of examples.

EXAMPLE 1 ACCORDING TO THE INVENTION: PRODUCTION OF A BACKBONE-FUNCTIONALIZED POLYMER COMPOSITION

1a) Polymerization and Modification:

A dry 20 L steel autoclave, inertized with nitrogen, was filled with 8500 g of hexane (dried over molecular sieve), 1300 g of 1,3-butadiene, 25 mmol of a 20% strength solution of diisobutylaluminium hydride in hexane, 1.44 mmol of a 10% strength solution of ethylaluminium sesquichloride in hexane, and 1.44 mmol of a 40% strength solution of neodymium versatate in hexane. It was heated with stirring to 65° C. and the mixture was polymerized with stirring for 60 min. The temperature in the reactor was kept at 70° C. The polymerization was stopped by addition of 6.5 g of lauric acid (0.5 phr) and stabilized by addition of 1.3 g of Irganox 1520.

A conversion sample was taken. The butadiene conversion after the polymerization was 95%. The polymer composition solution has the following intermediate parameters:
Starting Mooney viscosity (ML 1+4 at 100° C.): 29.8 MU;
Microstructure: 97.3% by wt. 1,4-cis; 1.8% by wt. 1,4-trans; 0.8% by wt. 1,2-vinyl 720 g of the polymer composition solution were transferred to a 2 L reactor. At 65° C., a solution of 0.187 g of disulphur dichloride (0.2 phr) in 10 mL of hexane was added for modification. The solution was stirred at 65° C. for a further 30 min. The polymer composition was precipitated by introducing into 5 kg of ethanol, stabilized with further Irganox 1520 (0.1 phr) and dried in vacuo at 70° C.

The polymer composition, the Mooney viscosity of which was increased ("Mooney-jumped"), has the following parameters:
Mooney viscosity (ML 1+4 at 100° C.): 45.1 MU,
Gel content <0.3 by wt.-%

1b) Functionalization of the "Mooney-Jumped" Polymer Composition:

As a functionalization reagent mixture, a functionalization reagent mixture (Variant 1) of 4 g of DBD was mixed with 6 g of talc and 0.08 g of iron phthalocyanine in a mortar.

70 g of the polymer composition from 1a) were treated at 120° C. with 0.44 g of the pre-mixture on the laboratory roll. The roll gap was 0.4 mm, the roll diameter 10 cm. The roll time was 15 min.

Mooney viscosity (ML 1+4 at 100° C.): 29.4 MU

The "Mooney-jumped" polymer composition from 1a) was used as a comparison example for the production of the vulcanizates (P1) and (P1*), as the Mooney viscosity of this polymer composition corresponds to that of the backbone-functionalized polymer composition according to the invention according to 2b).

The backbone-functionalized polymer composition according to the invention from 1b) was not used for the vulcanizate test because of the low Mooney viscosity.

EXAMPLE 2 ACCORDING TO THE INVENTION: PRODUCTION OF A BACKBONE-FUNCTIONALIZED POLYMER COMPOSITION ACCORDING TO THE INVENTION

2a) Polymerization and Modification:

A dry 20 L steel autoclave, inertized with nitrogen, was filled with 8500 g of hexane (dried over molecular sieve), 1300 g of 1,3-butadiene, 21 mmol of a 20% strength solution of diisobutylaluminium hydride in hexane, 1.44 mmol of a 10% strength solution of ethylaluminium sesquichloride in hexane, and 1.44 mmol of a 40% strength solution of neodymium versatate in hexane. It was heated to 73° C. with stirring and polymerized for 60 min with stirring. The temperature in the reactor increased to 90° C. The polymerization was stopped by addition of 6.5 g of stearic acid (0.5 phr).

A conversion sample was taken. The butadiene conversion was 98.7% after the polymerization.

The polymer composition solution has the following intermediate parameters before the modification:
Starting Mooney viscosity (ML 1+4 at 100° C.): 40 MU;
Mooney stress relaxation (MSR at 100° C.): 0.65
Microstructure: 97.5% by wt. 1,4-cis; 2.0% by wt. 1,4-trans; 0.5% by wt. 1,2-vinyl 3.33 g of disulphur dichloride (0.3 phr), less the amount for the determination of the butadiene conversion and for the determination of the intermediate parameters, were added to the polymer composition solution at 95° C. for modification. The solution was stirred at 95° C. for a further 10 min. The polymer composition was precipitated by introducing into 5 kg of ethanol, stabilized with Irganox 1520 (0.2 phr) and dried at 70° C. in vacuo.

The now modified or "Mooney-jumped" polymer composition has the following parameters:

Mooney viscosity (ML 1+4 at 100° C.): 62.7 MU, Mooney stress relaxation (MSR at 100° C.): 0.46; gel content <0.3% by wt.

Microstructure: 97.4% by wt. 1,4-cis; 2.0% by wt. 1,4-trans; 0.6% by wt. 1,2-vinyl Molar mass: Mn=212 kg/mol, Mw=462 kg/mol, Mz=1150 kg/mol; polydispersity (Mw/Mn)=2.17

Solution viscosity: 288 mPas

2b) Functionalization of the "Mooney-Jumped" Polymer Composition:

230 g of rubber were mixed for 5 min in the internal mixer of the Brabender type at a speed of rotation of 20 rpm and heated to 130° C. 1.44 g of the functionalization reagent mixture (Variant 1) were added to this and mixed for 1 min under the same conditions as from Example 1b). This procedure was carried out a total of 4 times. The rubber was combined.

Mooney viscosity (ML 1+4 at 100° C.): 41.0 MU, Mooney stress relaxation (MSR at 100° C.): 0.42; gel content <0.3% by wt.

The now backbone-functionalized polymer composition according to the invention is used for the production of vulcanizates.

EXAMPLE 3: FUNCTIONALIZATION OF THE "MOONEY-JUMPED" POLYMER COMPOSITION USING A FUNCTIONALIZATION REAGENT MIXTURE (VARIANT 2)

230 g of the polymer composition from Example 2a) were mixed for 5 min in the internal mixer of the Brabender type at a speed of rotation of 20 rpm and heated to 130° C. A functionalization reagent mixture consisting of 0.58 g of $(EtO)_3Si-C_3H_6-S_4-C_3H_6-Si(OEt)_3$ and 0.1 g of iron phthalocyanine (Variant 2) was added and mixed under identical conditions for a further minute.

Polymer composition before the functionalization: Mooney viscosity (ML 1+4 at 100° C.): 62.7 MU Polymer composition after the functionalization: Mooney viscosity (ML 1+4 at 100° C.): 45.1 MU

EXAMPLE 4: FUNCTIONALIZATION OF THE "MOONEY-JUMPED" POLYMER COMPOSITION USING A FUNCTIONALIZATION REAGENT MIXTURE (VARIANT 3)

230 g of the polymer composition from Example 2a) were mixed for 5 min in the internal mixer of the Brabender type having a speed of rotation of 20 rpm and heated to 150° C. Only 1.1 g DBD were added to this as a functionalization reagent (Variant 3). It was mixed under the same conditions, for another 5 min.

Polymer composition before the functionalization: Mooney viscosity (ML 1+4 at 100° C.) 62.7 MU Polymer composition after the functionalization: Mooney viscosity (ML 1+4 at 100° C.): 42.2 MU Tests:

A: Determination of the gel content of polybutadiene in styrene as a gravimetric procedure analogously to the method BAYELAS MO AQ 259—A LAB:

25.0 g of polymer are weighed accurately to 0.1 g on the laboratory balance. The edges are cut off beforehand and discarded. The polymer is cut into small pieces. 850 ml of filtered styrene are introduced into a 1 l wide-necked flask and the polymer is dissolved on the shaker for about 4 hours.

The wire mesh annealed beforehand consisting of a wire gauze having a mesh width 0.036 mm, Ø 50 mm is added for cooling to a dry glass beaker in the desiccator. After cooling, the wire mesh is taken out of the dry glass beaker and weighed accurately to 0.1 mg on the analytical balance. The weight A results. In each case, 100 ml of filtered styrene are prepared in three glass beakers. The wire mesh having a diameter of 50 mm is inserted in the "Gelman" metal filtration system (seal/filter/seal) and the funnel attachment is screwed on.

The polymer solution is then poured through the filter. The first of the three glass beakers coated with styrene is used for rinsing the wide-necked flask and this solution is likewise added through the filter. The filter is subsequently rinsed with the two further portions of styrene.

The filter is now carefully removed with forceps and placed on clean cellulose. The edge of the filter is carefully pressed with the forceps. The evaporating styrene is observed using a magnifying glass. The damp wire filter, still wetted with styrene, becomes visibly lighter with decreasing amount of styrene. If all meshes of the filter are styrene-free, it is immediately re-weighed on the balance. The weight B results. After re-weighing of the filter, it is dried in the drying cabinet for 15 minutes at 100° C. (±5° C.) for determination of the dry gel content. The filter here is situated in an open dry glass beaker. After drying, the glass beaker together with filter is added to the desiccator for cooling for approximately 10 minutes and subsequently weighed again. The weight C results.

Calculations:

$$\text{Wet gel} = \frac{(B-A)*10^6}{25} \text{ [ppm]}$$

$$\text{Dry gel} = \frac{(C-A)*10^6}{25} \text{ [ppm]}$$

$$\text{Swelling index} = \frac{\text{wet gel}}{\text{dry gel}} \text{ [without dimension]}$$

B: Mooney viscosity and Mooney stress relaxation according to ASTM D1646-00

C: Solution viscosity according to ISO 3105:

5.43% polymer solution in toluene is measured at room temperature using a Brookfield DV-I type rotational viscometer.

D: GPC was carried out by Currenta.

E: Microstructure determination

Currenta, ELA 101: A solution of the polymer in toluene is added to a KBr window, the solvent is evaporated and the polymer film is measured between 2 KBr windows by means of FTIR spectroscopy.

Irganox 1520: 4,6-Bis(octylthiomethyl)-o-cresol from BASF.

Preparation of Rubber Mixtures and Vulcanizates

Rubber mixtures were prepared which contain the "Mooney-jumped" polymer composition from Example 1a) as a comparison example (P1) and the backbone-functionalized polymer composition according to the invention from Example 2b) (P2). Both polymer compositions have a comparable Mooney viscosity of 45 MU and 42 MU respectively.

In the case of the rubber mixtures P1* and P2*, in each case 50 phr of the above-mentioned polymer composition were treated with in each case 50 phr of natural rubber.

The backbone-functionalized polymer composition from Example 1b) was not employed for the rubber mixture because of the low Mooney viscosity of <30 MU.

The rubber mixtures were firstly prepared without sulphur and accelerator in a 1.5 L kneader.

The substances sulphur and accelerator were then admixed on a roller at 40° C.

TABLE 1-continued

| Trade name | Manufacturer |
|---|---|
| TSR/RSS 3 DEFO 700 | Natural rubber of the type Defo 700 |

TABLE 2

| | | P1 | P2 | P1* | P2* |
|---|---|---|---|---|---|
| Mooney-jumped polymer composition from Example 1a | | 100 | | 50 | |
| Example 2b according to the invention | | | 100 | | 50 |
| TSR/RSS 3 DEFO 1000 | | | | 50 | 50 |
| STATEX N 330 | | 50 | 50 | 50 | 50 |
| VIVATEC 500 | | 4 | 4 | 4 | 4 |
| EDENOR C 18 98-100 | | 2 | 2 | 2 | 2 |
| VULKANOX 4020/LG | | 2 | 2 | 2 | 2 |
| VULKANOX HS/LG | | 3 | 3 | 3 | 3 |
| ZINKWEISS ROTSIEGEL | | 3 | 3 | 3 | 3 |
| MAHLSCHWEFEL 90/95 CHANCEL | | 2.36 | 2.36 | 2.36 | 2.36 |
| VULKACIT CZ/EGC | | 1.4 | 1.4 | 1.4 | 1.4 |
| Monsanto - MDR: 160° C., 30 min | | | | | |
| Minimum torque | [dNm] | 2.52 | 2.52 | 2.02 | 1.89 |
| Maximum torque | [dNm] | 26.4 | 24.2 | 22.4 | 21.4 |
| Rise time TS1 | s | 141 | 124 | 133 | 121 |
| Rise time TS2 | s | 163 | 139 | 151 | 136 |
| 10% turnover time | s | 167 | 140 | 151 | 135 |
| 50% turnover time | s | 210 | 175 | 188 | 169 |
| 95% turnover time | s | 371 | 319 | 326 | 299 |
| Mooney viscosity ML1 + 4/100 | | | | | |
| ML 1 + 4 | ME | 68.7 | 72.5 | 56.1 | 54.7 |
| Tensile test rod S2 RT | | | | | |
| S10 | MPa | 0.7 | 0.6 | 0.7 | 0.6 |
| S100 | MPa | 2.7 | 2.7 | 3.1 | 3.2 |
| S300 | MPa | 12.5 | 13.7 | 14.4 | 15.7 |
| D Median | % | 367 | 354 | 419 | 440 |
| F Median | MPa | 16.8 | 17.3 | 22.0 | 24.3 |
| Hardness at 60° C. | Shore A | 63.5 | 63.5 | 62.0 | 62.0 |
| Rebound elasticity at 60° C. | % | 65.6 | 66.5 | 65.6 | 68.1 |
| MTS amplitude sweep @ 60° C., 1 Hz | | | | | |
| G* (0.5%) | MPa | 2.42 | 2.06 | 2.24 | 2.1 |
| G* (15%) | MPa | 1.49 | 1.41 | 1.28 | 1.26 |
| G* (0.5%) – G* (15%) | MPa | 0.93 | 0.65 | 0.96 | 0.84 |
| tan d (max.) | | 0.108 | 0.097 | 0.122 | 0.114 |
| Dynamic damping DIN 53513; Ares strip, 10 Hz, 1 K/min | | | | | |
| E'(0° C.) | MPa | 12.01 | 9.22 | 15.62 | 11.7 |
| tan d (0° C.) | | 0.068 | 0.068 | 0.089 | 0.085 |
| E' (23° C.) | MPa | 10.9 | 8.44 | 13.32 | 10.14 |
| tan d (23° C.) | | 0.058 | 0.057 | 0.073 | 0.064 |
| E' (60° C.) | MPa | 9.89 | 7.77 | 11.02 | 8.71 |
| tan d (60° C.) | | 0.048 | 0.046 | 0.058 | 0.050 |
| Abrasion DIN 53516 | mm$^3$ | 13 | 12 | 49 | 45 |

Table 2 lists the recipes and test results of the vulcanizates.

The following substances were employed for the mixing studies:

TABLE 1

| Trade name | Manufacturer |
|---|---|
| CORAX N 326 as carbon black | Evonic Degussa GmbH |
| VIVATEC 500 as oil | Hansen und Rosenthal KG |
| ZINKWEIβ ROTSIEGEL as zinc oxide | Grillo Zinkoxid GmbH |
| EDENOR C 18 98-100 as stearic acid | Caldic Deutschland GmbH |
| VULKANOX 4020/LG as stabilizer | Lanxess Deutschland GmbH |
| VULKANOX HS/LG as stabilizer | Lanxess Deutschland GmbH |
| VULKACIT ® CZ/EGC as accelerator | Lanxess Deutschland GmbH |
| RHENOGRAN IS 60-75 as sulphur | RheinChemie Rheinau GmbH |

Compared with the comparison examples P1 and P2, the tests P1* and P2* according to the invention show a decrease in the vulcanization time needed in Monsanto MDR, marked improvement of the indicators for the low rolling resistance, such as a high rebound elasticity at 60° C., a low tangent delta maximum in the MTS test at 60° C. and a low tangent delta at 60° C. in the Eplexor test, better results in the tensile strain test, apparently from a higher quotient of S300/S10 and lower values in the abrasion test.

Vulcanizate Tests

The following characteristics of the vulcanizates were determined according to the standards mentioned:

DIN 53505: Shore A hardness at 60° C.

DIN 53512: Rebound elasticity at 60° C.

DIN 53504: Tension values at 10%, 100%, and 300% elongation ($\sigma_{10}$, $\sigma_{100}$, and $\sigma_{300}$), tensile strength and elongation at break
DIN 53516: Abrasion For the determination of the dynamic characteristics (temperature dependence of the storage modulus E' in the temperature range −60° C. to 0° C. and tan δ at 60° C.), an Eplexor apparatus (Eplexor 500 N) of the company Gabo-Testanlagen GmbH, Ahlden, Germany was employed. The measurements were determined according to DIN53513 at 10 Hz on Ares strips in the temperature range −100° C. to +100° C. with a heating rate of 1K/min.

Using the method the following measured variables were obtained, which are designated according to ASTM 5992-96:
E' (60° C.): Storage modulus at 60° C.
E' (23° C.): Storage modulus at 23° C.
E' (00° C.): Storage modulus at 0° C.
and
tan δ (60° C.): Loss factor (E"/E') at 60° C.
tan δ (23° C.): Loss factor (E"/E') at 23° C.
tan δ (00° C.): Loss factor (E"/E') at 0° C.
E' yields an index for the grip of the winter tyre tread on ice and snow. The lower E', the better the grip.
Tan δ (60° C.) is a measure of the hysteresis loss during rolling of the tyre. The lower tan δ (60° C.), the lower the rolling resistance of the tyre.
DIN53513-1990: Elastic characteristics—For the determination of the elastic characteristics, an MTS elastomer test system (MTS Flex Test) of the company MTS was employed. The measurements were determined according to DIN53513-1990 on cylinder samples (2 samples, each of 20×6 mm) with overall 2 mm compression at a temperature of 60° C. and a measurement frequency of 1 Hz in the region of the amplitude sweep from 0.1 to 40%.

Using the method, the following measured variables were obtained, which are designated according to ASTM 5992-96:
G* (0.5%): Dynamic modulus with 0.5% amplitude sweep
G* (15%): Dynamic modulus with 15% amplitude sweep
G* (0.5%)–(15%): Difference in the dynamic modulus with 0.5% to 15% amplitude sweep
and
tan δ (max): maximal loss factor (G"/G') of the entire measuring range at 60° C.
G* (0.5%)–(15%) yields an index for the Payne effect of the mixing, where a low value indicates a good filler distribution and thus a low rolling resistance.
Tan δ (max) is a measure of the hysteresis loss during rolling of the tyre. The lower tan δ (max), the lower the rolling resistance of the tyre.

What is claimed is:

1. A vulcanizable polymer composition comprising functionalized polydienes according to the general formula (I):

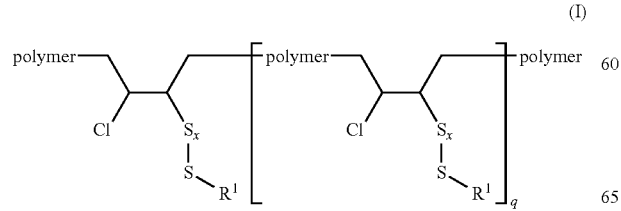

where:
x is identical or different and is an integer 1 to 8;
q is identical or different and is 0 to 20;
polymer is identical or different and represents polymer units of the formula (II)

where:
n is identical or different and is 1 to 200,000,
m is identical or different and is 0 to 50,000,
p is identical or different and is 1 to 100,000,
diene is formed by polymerization of butadiene and/or isoprene, and
styrene is formed by polymerization of styrene or substituted styrene;
$R^1$ is identical or different and is selected from:
a group of compounds of the formula (III)

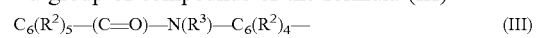

where $R^2$ and $R^3$ are identical or different and represent a hydrogen radical, a linear or branched alkyl radical having 1 to 16 C atoms, a phenyl radical, or a cycloalkyl radical having 5 to 8 C atoms;
a radical of the formula (IV)

where $R^4$ is identical or different and represents a hydrogen, a halogen, a nitro or a hydroxyl radical, a linear or branched alkyl radical having 1 to 12 C atoms, a linear or branched alkoxy radical having 1 to 12 C atoms, a phenyl radical, or a cycloalkyl radical having 5 to 8 C atoms, or the $R^4$ jointly forms a radical of the formula (V)

where $R^5$ is identical or different and represents a hydrogen radical, a hydroxyl radical, a linear or branched alkyl radical having 1 to 12 C atoms, a linear or branched alkoxy radical having 1 to 12 C atoms, a phenyl radical, or a cycloalkyl radical having 5 to 8 C atoms;
a radical of the formula (VI)

where:
n' is an integer 1 to 12;
m' is a number 0 to 4;

R⁶ is identical or different and represents a linear or branched alkyl radical having 1 to 16 C atoms, a phenyl radical, or a cycloalkyl radical having 5 to 8 C atoms;
Y represents sulphur, or a radical of the formula VIIa, VIIb, VIIc, VIId or VIIe $$-\!\!\!+\!\!S_{x'}-CH_2CH_2-\!\!\!+_p \quad (VIIa)$$

$$-\!\!\!+\!\!S_{x'}-CH_2-\overset{OH}{\underset{|}{CH}}-CH_2-\!\!\!+_p \quad (VIIb)$$

$$-\!\!\!+\!\!S_{x'}-CH_2-CH_2OCH_2CH_2-\!\!\!+_p \quad (VIIc)$$

$$-\!\!\!+\!\!S_{x'}-CH_2-\!\!\!\langle\!\!\!\!\!-\!\!\!\!\rangle\!\!\!-CH_2-\!\!\!+_p \quad (VIId)$$

(VIIe) — triazine structure with $S_{x'}$ and $R^8$ where
x' is an integer 1 to 8;
p is an integer 1 to 12;
R⁸ is identical or different and represents a linear or branched alkyl radical having 1 to 16 C atoms, an alkoxy radical having 1 to 16 C atoms, a phenyl radical, or a phenoxy radical;
a radical of the formula (VIII)

$$(R^9)_2N-(C\!\!=\!\!Z)- \quad (VIII)$$

where:
Z represents sulphur or oxygen,
R⁹ is identical or different and represents a linear or branched alkyl radical having 1 to 16 C atoms, a phenyl radical, or a cycloalkyl radical having 5 to 8 C atoms; or
a radical of the formula (IX)

$$R^{10}-O-C(\!\!=\!\!S)- \quad (IX)$$

where R¹⁰ is identical or different and represents a linear or branched alkyl radical having 1 to 16 C atoms, a phenyl radical, or a cycloalkyl radical having 5 to 8 C atoms.

2. The vulcanizable polymer composition according to claim 1, wherein the functionalized polydienes comprise neodymium-catalyzed polybutadienes (NdBRs) having a proportion of cis-1,4 units of >95% by wt. and a proportion of 1,2-vinyl content of <1% by wt.

3. The vulcanizable polymer composition according to claim 2, wherein the NdBR is modified with sulphur chlorides after the polymerization.

4. The vulcanizable polymer composition according to claim 1, wherein the functionalized polydienes comprise styrene-butadiene copolymers, where the copolymers are modified such that their Mooney viscosities are increased after the polymerization.

5. The vulcanizable polymer composition according to claim 1, wherein the functionalized polydienes have the following characteristics:

a. a molar mass (Mw) of 1 to 10,000 kg/mol,
b. a polydispersity as Mw/Mn of 1 to 5,
c. a Mooney viscosity of 30 MU to 150 MU,
d. a content of sulphur of 0.02 to 1% by wt. based on 100% by wt. of the functionalized polydienes,
e. a content of chlorine of 0.01 to 1% by wt. based on 100% by wt. of the functionalized polydienes, and
f. the number of groups R¹ is 1 to 21 units per polymer unit, based on 100% by wt. of the functionalized polydienes.

6. A process for the production of the vulcanizable polymer composition according to claim 1, the process comprising:
forming the functionalized polydienes by
polymerizing diene and optionally styrene monomers to produce polymers, and
thereafter reacting the polymers with sulphur chlorides thus increasing Mooney viscosity via sulphur bridge bonding, whereby Mooney jumped polymer is formed, and
reacting the Mooney jumped polymer with a functionalization reagent mixture containing a compound having the general formula (X)

$$R^1-S-S-R^1 \quad (X).$$

7. The process according to claim 6, wherein the compound of formula (X) is at least one of tetramethylthiuram disulphide and a compound of the formula (VIb)

$$(EtO)_3Si-C_3H_6-S_2-C_3H_6-Si(OEt)_3 \quad (VIb).$$

8. The process according to claim 6, wherein the functionalization reagent mixture further comprises an activator comprising a transition metal salt, where the transition metal is selected from the group consisting of Fe, Co, Cu, Ni, Mn, and Cr.

9. The process according to claim 8, wherein the transition metal salt is an Fe salt selected from Fe phthalocyanine and Fe hemiporphyrazine.

10. The process according to claim 6, wherein the functionalization reagent mixture further comprises an activator selected from pentachlorothiophenol and its salts.

11. The process according to claim 6, wherein the functionalization reagent mixture further comprises an activator selected from organic peroxides according to the formula (XI)

$$R^{11}-O-O-R^{12} \quad (XI)$$

where:
R¹¹ and R¹² are identical or different and represent:
a hydrogen radical,
a linear or branched alkyl radical having 1 to 16 C atoms,
a phenyl radical,
a cycloalkyl radical having 5 to 8 C atoms, or
a carboxyl radical R¹³—(C=O)—, where R¹³ represents a linear or branched alkyl radical having 1 to 16 C atoms, a phenyl radical, or a cycloalkyl radical having 5 to 8 C atoms.

12. The process according to claim 6, wherein the functionalization reagent mixture additionally contains waxes and/or fillers.

13. The process according to claim 6, wherein the reacting step comprises mixing with thermal or mechanical energy input.

14. The process according to claim 13, wherein the mixing is via a mixer extruder or roller at a temperature of 70° C. to 160° C.

15. The process according to claim 6, wherein the functionalization reagent mixture comprises 5 to 100% by wt. of one or more compounds of the formula (X) based on 100% by wt. of functionalization reagent mixture.

16. The process according to claim 6, wherein the functionalization reagent mixture comprises, based on 100% by wt. of functionalization reagent mixture:
a) 5 to 100% by wt. of one or more compounds of the formula (X); and
at least one of:
b) 0.01 to 5% by wt. of activators, proportionally to loads of the compound of formula (X);
c) 0.01 to 90% by wt. of waxes, proportionally to loads of the compound of formula (X); and
d) 0.01 to 90% by wt. of fillers, proportionally to loads of the compound of formula (X).

17. The process according to claim 6, wherein:
the reacting step comprises mixing with thermal or mechanical energy input;
the mixing is done at a temperature of 80° C.-140° C.; and
the functionalization reagent mixture comprises, based on 100% by wt. of functionalization reagent mixture:
a) 30 to 50% by wt. of one or more compounds of the formula (X) selected from tetramethylthiuram disulphide and a compound of the formula (VIb)

(EtO)$_3$Si—C$_3$H$_6$—S$_2$—C$_3$H$_6$—Si(OEt)$_3$     (VIb); and at least one of:
b) 0.3-1% by wt. of activators, proportionally to loads of the compound of formula (X), wherein the activators are selected from the group consisting of Fe phthalocyanine, Fe hemiporphyrazine, pentachlorothiophenol, zinc salts of pentachlorothiophenol, and organic peroxides according to the formula (XI)

R$^{11}$—O—O—R$^{12}$     (XI)

where:
R$^{11}$ and R$^{12}$ are identical or different and represent:
a hydrogen radical,
a linear or branched alkyl radical having 1 to 8 C atoms, a phenyl radical, a cycloalkyl radical having 5 to 8 C atoms, or
a carboxyl radical R$^{13}$—(C=O)—, where R$^{13}$ represents a linear or branched alkyl radical having 1 to 8 C atoms, a phenyl radical, or a cycloalkyl radical having 5 to 8 C atoms;
c) 30-50% by wt. of waxes, proportionally to loads of the compound of formula (X); and
d) 10-30% by wt. of fillers, proportionally to loads of the compound of formula (X).

18. A vulcanizable polymer composition of functionalized polydienes according to the general formula (I):

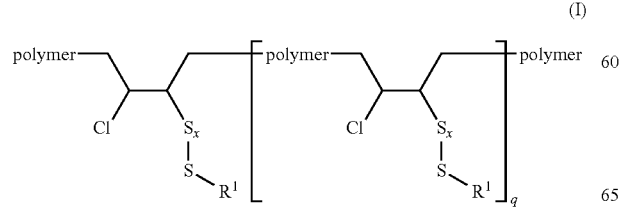
(I)

where:
x is identical or different and is an integer 1 to 3;
q is identical or different and is 0 to 20;
polymer is identical or different and represents polymer units of the formula (II)

(II)

where:
n is identical or different and is 1 to 200,000,
m is identical or different and is 0 to 10,
p is identical or different and is 1 to 100,000,
diene is C$_4$H$_6$—, and
styrene is C$_2$H$_3$(C$_6$H$_5$)—; and
R$^1$ is identical or different and selected from:
a group of compounds of the formula (III)

C$_6$(R$^2$)$_5$—(C=O)—N(R$^3$)—C$_6$(R$^2$)$_4$     (III)

where R$^2$ and R are identical or different and represent a hydrogen radical, a linear or branched alkyl radical having 1 to 8 C atoms, a phenyl radical, or a cycloalkyl radical having 5 to 8 C atoms;
a radical of the formula (IV)

(IV)

where R$^4$ is identical or different and represents a hydrogen, a halogen, a nitro or a hydroxyl radical, a linear or branched alkyl radical having 1 to 8 C atoms, a linear or branched alkoxy radical having 1 to 8 C atoms, a phenyl radical, or a cycloalkyl radical having 5 to 8 C atoms or the R$^4$ jointly forms a radical of the formula (V)

(V)

where R$^5$ is identical or different and represents a hydrogen radical, a hydroxyl radical, a linear or branched alkyl radical having 1 to 12 C atoms, a linear or branched alkoxy radical having 1 to 12 C atoms, a phenyl radical, or a cycloalkyl radical having 5 to 8 C atoms;
a radical of the formula (VI)

(R$^6$O)$_3$Si—(CH$_2$)$_{n'}$—(Y)$_{m'}$— (R$^6$O)$_3$Si—(CH$_2$)$_{n'}$—(Y)$_{m'}$—     (VI)

where:
n' is an integer 1 to 6;
m' is a number 0 to 2;
R$^6$ is identical or different and represents a linear or branched alkyl radical having 1 to 8 C atoms, a phenyl radical, or a cycloalkyl radical having 5 to 8 C atoms;
Y represents sulphur, a radical of the formula VIIa, VIIb, VIIc, VIId, or VIIe

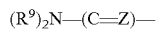 (VIIa)

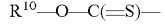 (VIIb)

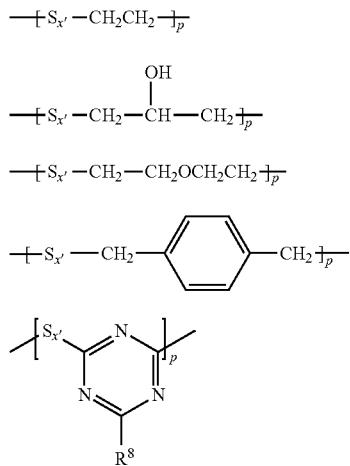

where
x' is an integer 2 to 6;
p is an integer 1 to 6;
$R^8$ is identical or different and represents a linear or branched alkyl radical having 1 to 8 C atoms, an alkoxy radical having 1 to 8 C atoms, a phenyl radical, or a phenoxy radical;
a radical of the formula (VIII)

$$(R^9)_2N-(C=Z)- \qquad (VIII)$$

where:
Z represents sulphur or oxygen,
$R^9$ is identical or different and represents a linear or branched alkyl radical having 1 to 8 C atoms, a phenyl radical, or a cycloalkyl radical having 5 to 8 C atoms; or
a radical of the formula (IX)

$$R^{10}-O-C(=S)- \qquad (IX)$$

where:
$R^{10}$ is identical or different and represents a linear or branched alkyl radical having 1 to 8 C atoms, a phenyl radical, or a cycloalkyl radical having 5 to 8 C atoms.

19. The vulcanizable polymer composition according to claim 18, wherein:
the functionalized polydienes are neodymium-catalyzed polybutadienes (NdBRs) modified with sulphur chlorides after the polymerization;
the functionalized polydienes have a proportion of cis-1,4 units of >95% by wt. and a proportion of 1,2-vinyl content of <1% by wt; and
the functionalized polydienes have the following characteristics:
a. a molar mass (MW) of 1 to 10,000 kg/mol,
b. a polydispersity as Mw/Mn of 1.2 to 3.0,
c. a Mooney viscosity of 30 MU to 150 MU,
d. a content of sulphur of 0.04 to 0.5% by wt., based on 100% by wt. of the functionalized polydienes,
e. a content of chlorine of 0.02 to 0.5% by wt., based on 100% by wt. of the functionalized polydienes, and
f. the number of groups $R^1$ is 2 to 15 units per polymer unit, based on 100% by wt, of the functionalized polydienes.

20. The vulcanizable polymer composition according to claim 18, wherein:
the functionalized polydienes comprise styrene-butadiene copolymers modified with sulphur chlorides after the polymerization such that their Mooney viscosities are increased after the polymerization; and
the functionalized polydienes have the following characteristics:
g. a molar mass (Mw) of 1 to 10,000 kg mol,
h. a polydispersity as Mw/Mn of 1.2 to 3.0,
i. a Mooney viscosity of 30 MU to 150 MU,
j. a content of sulphur of 0.04 to 0.5% by wt., based on 100% by wt. of the functionalized polydienes,
k. a content of chlorine of 0.02 to 0.5% by wt., based on 100% by wt. of the functionalized polydienes, and
l. the number of groups $R^1$ is 2 to 15 units per polymer unit, based on 100% by wt. of the functionalized polydienes.

* * * * *